(No Model.)
S. T. WILLIAMS.
WHEEL.
No. 325,301. Patented Sept. 1, 1885.
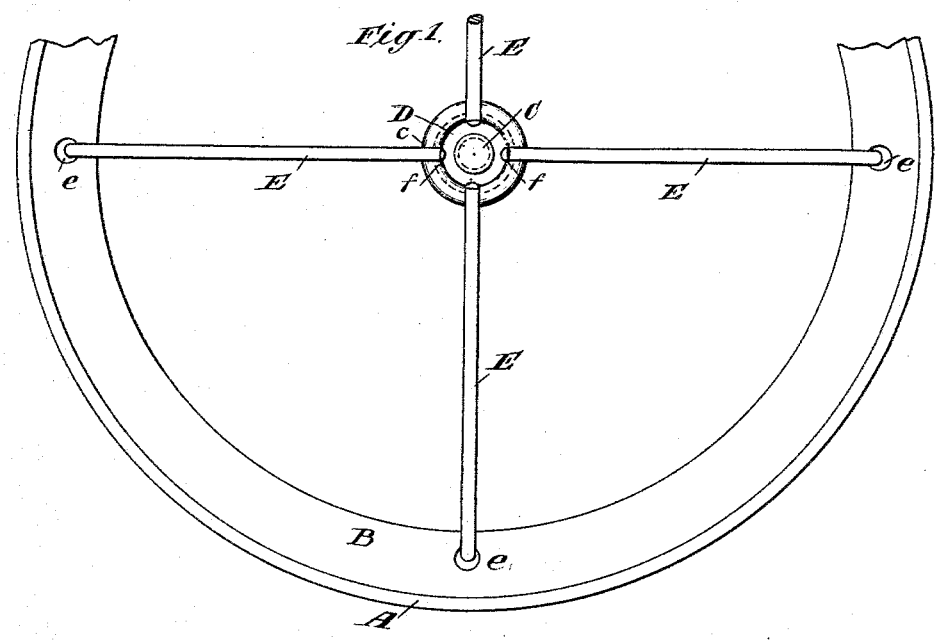
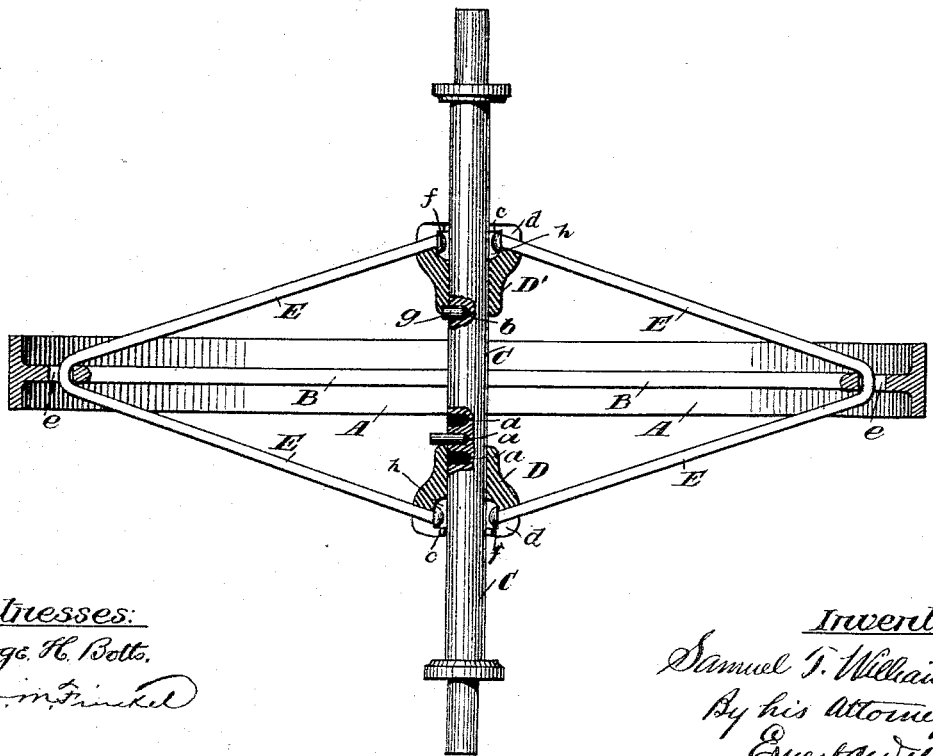
Witnesses:
George H. Botts.
Geo. M. Finkel
Inventor:
Samuel T. Williams
By his Attorney
Ernest C. Webb

UNITED STATES PATENT OFFICE.

SAMUEL T. WILLIAMS, OF RED BANK, NEW JERSEY.

WHEEL.

SPECIFICATION forming part of Letters Patent No. 325,301, dated September 1, 1885.

Application filed November 12, 1884. (No model.)

*To all whom it may concern:*

Be it known that I, SAMUEL T. WILLIAMS, a citizen of the United States, residing at Red Bank, in the county of Monmouth and State of New Jersey, have invented certain new and useful Improvements in Wheels, of which the following is a full, clear, and exact description.

My invention relates to certain improvements in metal wheels having spokes made of flexible material and adapted to be strained to impart stiffness and rigidity to the wheel.

The object of my present invention is to produce a wheel of this character which can be made very rapidly and cheaply, and at the same time be strong and durable.

To this end my invention consists in a wheel having a tire or rim and felly, spokes composed of strips of wire or other suitable material looped through holes in the felly and connected to hubs on the axle adapted to be separated without rotating to spread and strain the spokes, said hubs being held by removable keys set in slots in the axle, and in the details of my improvement, all as hereinafter fully set forth.

In the accompanying drawings, in both figures of which like parts are designated by similar letters of reference, Figure 1 is a side elevation of part of a wheel embodying my improvements, and Fig. 2 is a sectional view thereof.

A designates the tire or rim, and B the felly, preferably made in one piece and having a T shape in cross-section.

C designates the axle, having a series of slots, *a a a*, at one end, and a slot, *b*, at the other.

D D' designate the hubs, each consisting of a sleeve-like portion and enlarged ends hollowed out, and provided with an inwardly-overlapping rim, *c*, and a series of slots, *d*, drilled through the enlarged ends at the rim, there being as many slots in each hub as there are spokes on a side.

The spokes E are composed of strips of strong wire or other suitable material, each strip forming two spokes. The ends of each strip to form two spokes are provided with heads *f*, which are smaller than the holes *e* in the felly, and larger than the diameter of the slots *d* in the hubs. The strips forming the spokes are looped through the holes in the felly, and one end of each strip is sprung into a slot in the hub at one end, and the other into a slot in the hub at the other end, the heads *f* resting in the slots below the rims *c*, and being drawn when tension is applied, so that a portion of the heads enter and fit snugly into recesses *h*, formed in the hubs, as shown.

This method of inserting and holding the spokes is applicable to most all metal wheels in which the spoke ends are connected to devices on the axle adapted to be separated to tension the spokes.

By this means the spokes can be cut, shaped, and headed before they are connected to the tire and hubs, and this work can be done by machinery very cheaply and rapidly. Moreover, this construction of the hubs and spokes not only gives the spokes a sure connection to the hubs, but facilitates repairs in that by releasing the tension any spoke can be sprung out of the slots, and a broken or defective spoke can thus be removed and replaced without taking the wheel apart, cutting the spoke to be removed, or disturbing the other spokes.

After the spokes have been inserted as described the hubs D D' are then adjusted to spread and strain the spokes by sliding them on the axle until the inner end of the hub D' is outside of the slot *b*, and that of the hub D is outside of the first slot *a*. The hubs are then secured at these points by driving keys *g* into the respective slots.

To separate the hubs and increase the strain on the spokes, it is only necessary to force the hub D outwardly until it passes the second slot *a* and insert its key *g* into said slot. This is the position of the parts as shown in the drawings.

This wheel is very simple in its construction, inexpensive to make, and is particularly well adapted for wheelbarrows.

What I claim as my invention, and desire to secure by Letters Patent, is—

1. The wheel-rim, spokes, and axle, the last having the single slot *b* and series of slots *a a*, combined with the hubs D D' and keys *g*, for securing the hubs to the slotted axle and permitting the adjustment of the hub D toward and from the hub D', substantially as described.

2. In a wheel of substantially the construction described, the hubs D D', consisting of sleeve-like portions and enlarged ends hollowed out and provided with an inwardly-overlapping rim, and a series of slots, $d$, and recesses $h$, as herein shown and described.

3. The wheel-rim provided with holes $e$, combined with spokes first headed complete, and then passed through such holes and connected with slotted and adjustable hubs, and a shaft or axle to receive said hubs, substantially as described.

In testimony whereof I have hereunto set my hand this 6th day of November, A. D. 1884.

SAMUEL T. WILLIAMS.

Witnesses:
ARTHUR C. WEBB,
ERNEST C. WEBB.